United States Patent [19]

Walters

[11] Patent Number: 5,083,708

[45] Date of Patent: Jan. 28, 1992

[54] WILDLIFE REPELLANT UNIT

[76] Inventor: Gerald A. Walters, 24389 Raccoon Way, Oak Run, Calif. 96069

[21] Appl. No.: 565,562

[22] Filed: Aug. 8, 1990

Related U.S. Application Data

[63] Continuation of Ser. No. 286,808, Dec. 20, 1988, abandoned.

[51] Int. Cl.⁵ .............................................. A01M 13/00
[52] U.S. Cl. ......................................... 239/55; 239/57
[58] Field of Search .................................. 239/53–57; 43/124, 131, 132.1; 428/905

[56] References Cited

U.S. PATENT DOCUMENTS

| Re. 32,513 | 10/1987 | Seaber et al. | 239/56 |
|---|---|---|---|
| 2,606,065 | 8/1952 | Logan et al. | 239/53 |
| 3,046,192 | 7/1962 | Bileu | 239/56 X |
| 3,702,677 | 11/1972 | Heffington | 239/55 |
| 4,552,307 | 11/1985 | Stedharm | 239/57 |
| 4,802,626 | 2/1989 | Forbes et al. | 239/54 X |

Primary Examiner—Andres Kashnikow
Assistant Examiner—William Grant
Attorney, Agent, or Firm—Leonard D. Schappert

[57] ABSTRACT

A wildlife repellant unit is provided which is constructed of a substantially cylindrical tube having a cavity therein into which chemical repellant is placed, further having a barrier positioned inside the cavity to restrain the chemical wildlife repellant from deteriorating until activation, and further including a pair of openings positioned above the barrier to facilitate movement of air, thereby distributing the repulsive odors of the chemical repellant once the unit is activated. The body of the wildlife repellant unit may be constructed of a strong yet pliable material such as rubber or plastic so that, when it is pressed between the thumb and the forefinger, the barrier can be broken and the wildlife repellent unit activated. A clip is also provided to facilitate attachment of the wildlife repellant unit to a limb of a tree, thereby facilitating use of the wildlife repellant unit.

3 Claims, 2 Drawing Sheets

WILDLIFE REPELLANT UNIT

This is a continuation of application Ser. No. 07/286,808, filed Dec. 20, 1988, now abandoned.

BACKGROUND OF THE INVENTION

1. Field of the Invention

The present invention relates generally to devices utilized to protect plants, more specifically to devices utilized to protect small trees from wildlife such as deer and the like, and more particularly to a wildlife repellant unit which utilizes a repulsive odor to repel wild animals.

2. Description of the Prior Art

Past efforts at protecting plants from wild animals have included plant guards which utilize a form of net or foil or the like which is effective against attack by insects, but which allows the limbs of the plant to pass therethrough as necessary. Such plant guards have also included portions designed to be placed in the ground through which a root could pass, as well as portions designed to be above the ground to protect from rodents and deer and the like. Other such plant guards have included heat sinks to prevent overheating of the plant within the plant guard. While at least one of the plant guards, specifically U.S. Pat. No. 4,400,909, issued to Reese in 1983, teaches the use of a pesticide packet designed to make the plant untenable for certain pests, such pesticide packets do not bear any resemblance to the present invention. Other attempts to control wildlife have included chemical repellants sprayed on or around the plant or placed in a cloth bag which is then hung on the plant. None of the prior art of which applicant is aware has taught a wildlife repellant unit having the unique features of the present invention and which is as simple and easy to use and as effective as the present invention.

SUMMARY OF THE INVENTION

The present invention consists of a wildlife repellant unit which is useful in forestry and horticulture to protect plants from deer and other animals. The wildlife repellant unit of the present invention consists generally of a cylinder constructed of a pliable material such as rubber or plastic which has a cavity therein in which a chemical or other repellant having a repulsive odor may be placed. The wildlife repellant unit further has means for attaching to a limb of a tree or other plant. An opening is provided for the repulsive odor to exit the wildlife repellant unit when it is properly prepared and positioned on a tree or other plant. For purposes of storage, the wildlife repellant unit of the present invention is provided with a sealed section in which the chemical repellant may be positioned so that none of the odor or effectiveness is lost as a result of storage. The effectiveness of the wildlife repellant unit is further enhanced when the cylinder is constructed of dark material that will absorb heat from the sun, resulting in an increased amount of vapor exiting the wildlife repellant unit. The wildlife repellant unit further has an opening at or near the position of the chemical repellant, as well as an opening at the top of the unit, to facilitate constant and consistent movement of air therethrough, which therefore form what could be termed a chimney, and as air passes therethrough, it carries with it the repulsive odor of the chemical repellant. A clip is provided which facilitates attachment of the wildlife repellant unit to a branch of a tree or plant.

One of the objects of the present invention is to provide a wildlife repellant unit which is inexpensive to build.

Another object of the present invention is to provide a wildlife repellant unit which effectively repels deer and other wild animals, thereby protecting trees, bushes and the like.

A further object of the present invention is to provide a wildlife repellant unit which, because of its construction, is storable over a long period of time without substantial degradation of the ultimate performance.

Another object of the present invention is to provide a wildlife repellant unit which is light-weight yet easy to activate to facilitate more effective use in the field.

Another object of the present invention is to provide a wildlife repellant unit which is easily attached to a limb of a tree.

The foregoing objects, as well as other objects and benefits of the present invention, are made more apparent by the descriptions and claims which follow.

DESCRIPTION OF THE PREFERRED EMBODIMENT

Figure 1:
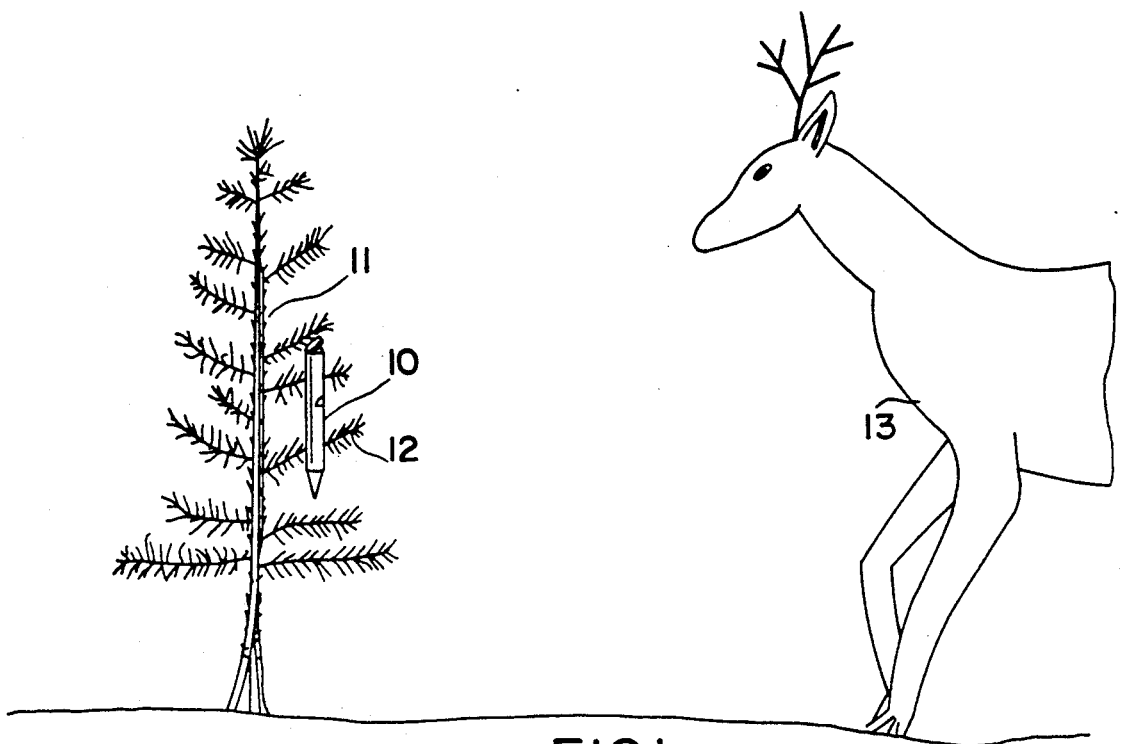
FIG. 1 is a side view showing how the wildlife repellant unit is utilized with a small tree to protect the tree from a deer.

As shown in FIG. 1 of the drawings, the wildlife repellant unit 10 is a tube-like structure which is easily attachable to a limb 12 of a tree 11. Once wildlife repellant unit 10 is activated so that it exudes an odor repulsive to wild animals, it is effective in protecting the tree 11 from a deer 13 as shown.

Figures 2, 3:
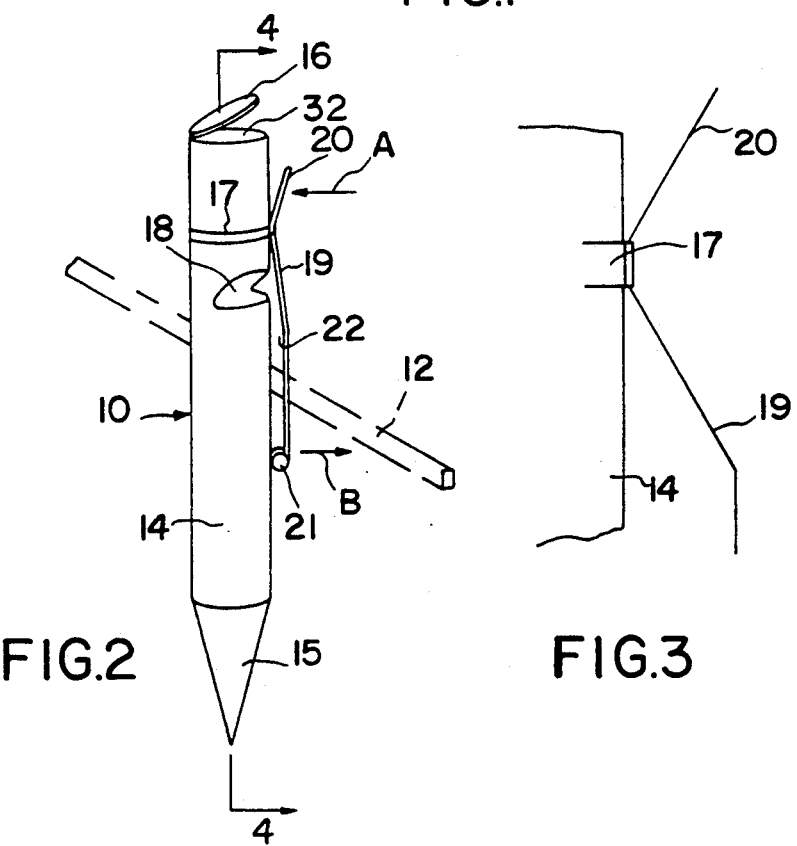
FIG. 2 is a perspective view showing particular features and construction of the wildlife repellant unit of the present invention.
FIG. 3 is a side view showing a portion of the wildlife repellant unit and how the clip is attached thereto.

In FIG. 2 of the drawings, the wildlife repellant unit 10 is shown in greater detail. Wildlife repellant unit 10 is constructed of a body 14 which in this particular embodiment is constructed of substantially cylindrical plastic material which is pressed together at the bottom end to form an end 15. An opening 18 is provided to facilitate circulation of air through the interior of the wildlife repellant unit 10, thereby facilitating distribution of the repulsive odor of the wildlife repellant. During use of the wildlife repellant unit 10, as air enters opening 18, it moves upward toward and through opening 32. The repellant material utilized is positioned below opening 18 to minimize drying out and to extend the life of wildlife repellant unit 10. A closure 16 is provided to close opening 32 during storage and until wildlife repellant unit 10 is ready to be activated. The positioning and sealing of closure 16 is shown in greater detail in FIG. 4 of the drawings. A clip 19, which may be constructed generally of strong metal material, is provided and is held against body 14 by band 17. During placement of wildlife repellant unit 10 on limb 12 of tree 11 of FIG. 1, extension 20 is pressed against body 14 as shown by arrow A, pushing end 21 outward as shown by arrow B so that clip 19 may be placed over limb 12. Limb 12 then extends between clip 19 and body 14 through gap 22 as shown.

FIG. 3 is a side view showing the attachment of clip 19 to body 14. Clip 19 is held against body 14 by band 17, which may be constructed of metal or plastic or any other acceptable strong material which is capable of holding it in position. Clip 19 may also be positioned utilizing screws or other attachment means capable of holding it in position.

Figure 4:
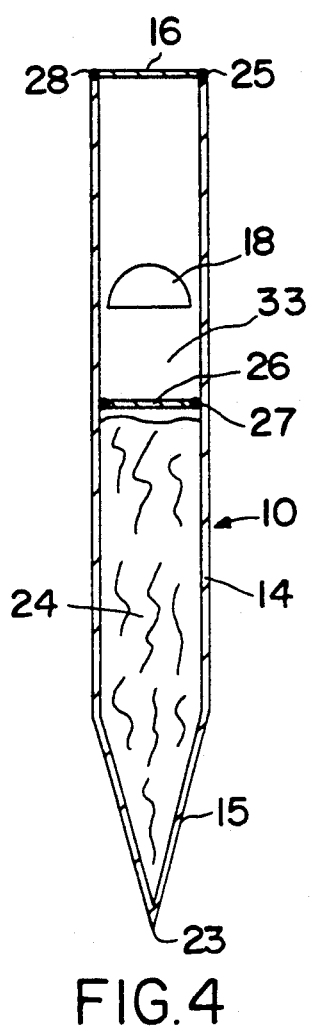
FIG. 4 is a cross-sectional view of the wildlife repellant unit taken along lines 4—4 of FIG. 2 and showing the interior structure of the unit.

FIG. 4 of the drawings is a cross-sectional view taken along lines 4—4 of FIG. 2 showing the construction of wildlife repellant unit 10. Wildlife repellant unit 10 may be constructed of a substantially cylindrical body 14 consisting of a rubber or plastic tube with one end 15 pressed together to form a tip 23. End 15 may be held together at tip 23 by means of heat sealing, as by melting, or gluing to form a strong structural bond. Body 14 has a cavity 33 therein extending from the top of wildlife repellant 10 down to the area where the repellant is positioned. While the chemical repellant 24 is held in position inside cavity 33 by means of an absorbent material such as cotton, the particular type of chemical repellant utilized is not important. What is important is that whatever chemical repellant is utilized must include an odor repulsive to wild animals. One such repulsive odor is that contained in mountain lion urine. Mountain lion urine could therefore be utilized, but any other effective repulsive chemical repellants might also be utilized. Chemical repellant 24 is contained inside cavity 33 by barrier 26, which is held in position by a seal 27. Barrier 26 may consist of a piece of plastic or rubber material and may be sealed by any effective seal at 27. In this particular embodiment, the barrier 26 and the seal 27 were constructed of wax to provide an effective barrier to keep the chemical repellant 24 from exiting the wildlife repellant unit 10 until desired. A closure 16 is provided at the top of body 14 to close cavity 33 until wildlife repellant unit 10 is activated. Closure 16 is attached to body 14 at point 28 by attaching means such as glue, silastic, rubber, a clip or any other effective attaching means. Closure 16 may be sealed by a sealing means 25 such as wax or any other effective sealing means if desired.

Figure 5:
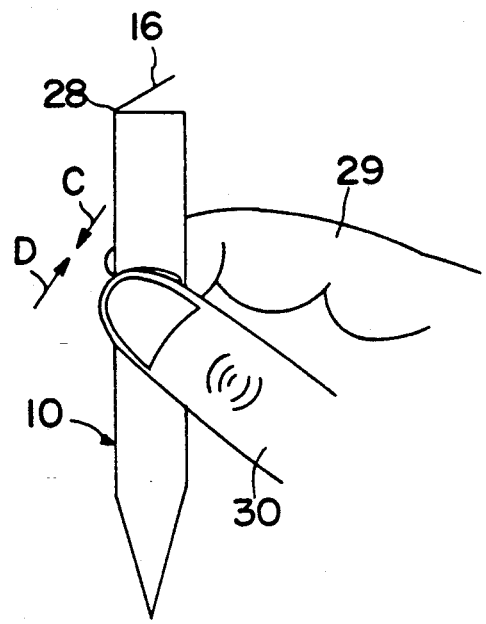
FIG. 5 is a perspective view showing how the wildlife repellant unit is activated.

FIG. 5 shows wildlife repellant unit 10 in position between thumb 30 and forefinger 29 of an individual and being activated. The operator presses thumb 30 and forefinger 29 together to squeeze wildlife repellant unit 10 as shown by arrows C and D, thereby breaking the seal which holds closure 16 in position and breaking internal barrier 26 to allow odor from chemical repellant 24 therein to exit through hole 32 and cavity 33 of the unit.

Figure 6:
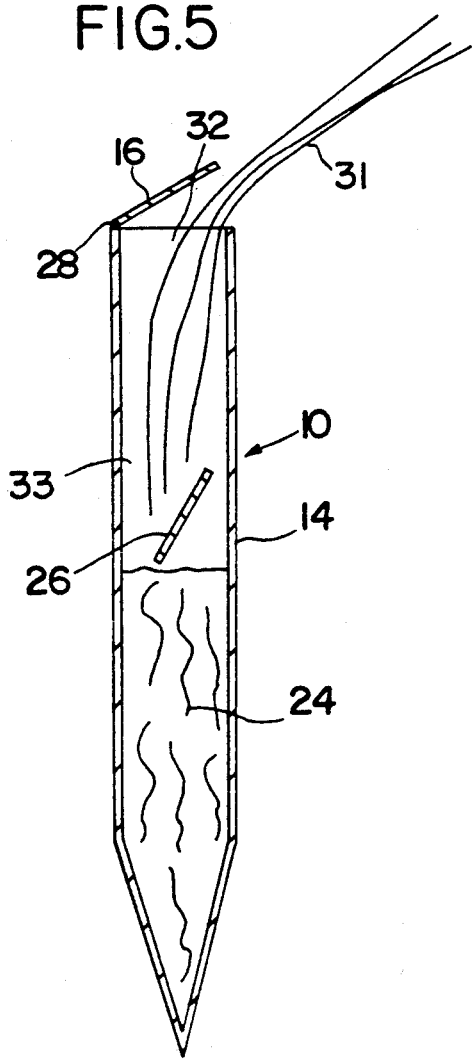
FIG. 6 is a cross-sectional view showing the interior of the wildlife repellant unit after it has been activated.

FIG. 6 shows the internal structure of the wildlife repellant unit 10 after activation. While opening 18 is not shown in FIG. 6, the position of opening 18 is as shown in FIG. 4 of the drawings. After barrier 26 has been broken and is in position as shown in FIG. 6, odors from chemical repellant 24 are no longer restrained from exiting wildlife repellant unit 10. As air enters wildlife repellant 10 through opening 18, it picks up the repulsive odor from chemical repellant 24 and exits through cavity 33 and hole 32 as shown by lines 31.

The effectiveness of moving air through cavity 33 of body 14 is increased when body 14 of wildlife repellant unit 10 is constructed of a dark material. When such a dark material is utilized, the area between opening 32 and opening 18 becomes similar to a chimney, being heated by sunlight, and as a result of the heat developed therein, the wildlife repellant unit 10 begins to draw air into opening 18 and to press air out through opening 32 in a thermosiphon fashion. Thus, the effectiveness of distributing the repulsive odor in the air is much increased by the use of a darker material.

While the foregoing description of the invention has shown a preferred embodiment using specific terms, such description is presented for illustrative purposes only. It is applicant's intention that changes and variations may be made without departure from the spirit or scope of the following claims, and this disclosure is not intended to limit applicant's protection in any way.

I claim:

1. A wildlife repellant unit, comprising:
   a hollow tubular body constructed of a substantially flexible material, having:
      a tap end;
      a bottom end;
      a cavity therein;
      a first opening positioned at said top end, and
      a second opening positioned between said top end and said bottom end;
   wildlife repellant material positioned inside of said cavity of said body below said second opening of said body; and
   a flexible barrier frangibly positioned inside said cavity between said second opening of said body and said wildlife repellant material creating a a sealed section of said wildlife repellant unit.

2. The wildlife repellant unit of claim 1 wherein said body is constructed of material sufficiently dark to absorb sufficient heat from skintight to heat air inside said cavity with resulting movement of air into said second opening through said cavity and out said first opening.

3. The wildlife repellant unit of claim 1, wherein said barrier consists substantially of a wax seal.

* * * * *